United States Patent Office 3,325,427
Patented June 13, 1967

3,325,427
METHOD OF DRY-MILLING CARBOXYLIC ELASTOMERS AND ALKALI LIGNINS
Joseph B. Doughty, Sullivan's Island, S.C., assignor to West Virginia Pulp and Paper Company, New York, N.Y., a corporation of Delaware
No Drawing. Filed Sept. 24, 1963, Ser. No. 311,208
2 Claims. (Cl. 260—17.5)

This invention relates to lignin-containing elastomeric compositions and particularly relates to rubbery products prepared by dry-milling carboxylic polymers and alkali lignins.

Carboxylic polymers are polymerized latex materials, of which at least one component material possessed unsaturated positions when in the monomeric state and of which at least one component retains carboxylic acid groups when in the polymeric state. As latexes, these component materials may be interpolymerized with the base elastomeric monomers to the extent desired to form water-and-solvent-insoluble carboxylic-type polymers. Typical unsaturated carboxylic monomers are acrylic acid, methacrylic acid, maleic anhydride, sorbic acid, crotonic acid, cinnamic acid, citraconic acid, and the like, which are generally interpolymerized with conventional elastomeric monomers at an additive level of 0.5% to 10% carboxylic polymer on a weight basis.

The usual elastomeric monomers are styrene with butadiene, butadiene with acrylonitrile, vinyl chloride, vinyl acetate, and the like. These monomers may be interpolymerized with the carboxylic monomers to form latexes, which may subsequently be isolated, as by precipitation and filtration, or may be combined therewith directly on the mill, as mentioned in "Carboxylic Elastomers," by Harold P. Brown and Carlin F. Gibbs, Industrial and Engineering Chemistry, vol. 47, No. 5, pages 1006 to 1012, wherein the preparation and vulcanization of carboxylic elastomers are described. Zinc oxide, zinc oxide-sulfur, polyamine, and epoxy curing systems may be used as accelerators or cation donors for final vulcanization, as discussed in "Carboxylic Latexes: (1) What Are They?" by G. E. Eilbeck and E. R. Urig and in "Carboxylic Latexes: (2) Compounding," by J. P. Davis and W. P. Welch, published in Rubber World, May 1963, pages 37–45.

Lignin has been utilized as a rubber extender for many years, as described by Pollak and Keilen in "Lignin for Reinforcing Rubber," Industrial and Engineering Chemistry, May 1947, vol. 39, pages 480–483. In the work described therein, and in the methods of U.S. 2,608,537, U.S. 2,572,884, U.S. 2,845,397, and U.S. 2,890,183, the addition method employed was to coprecipitate the lignin and rubber from an aqueous solution.

The lignin used in the instant invention is preferably the lignin recovered from the kraft papermaking process by acidification of its black liquor. The process described in U.S. 3,048,576, for instance, produces suitable lignin for use in this invention. A commercial kraft pine lignin identified as Indulin A was used in the examples described hereinafter and is a brown, free-flowing, amorphous powder having, typically, a specific gravity of 1.3, a moisture content of 2.15%, an ash content of 0.21%, and a methoxyl content of 12.6% by weight. This polyphenyl organic material is insoluble in water and in most aqueous acids but is readily soluble in aqueous alkaline solutions and is also soluble in many polar organic solvents.

Repeated efforts to introduce lignin into rubber by dry-milling have met with little success over the years. British Patent 691,608 described a product having superior properties imparted by addition of an aqueous lignin floc to a rubber after working in the Banbury; the results on page 3, lines 39–43 after milling dry lignin into rubber were 103 kg./cm.$^2$ (1470 p.s.i.) tensile strength and 43 kg./cm.$^2$ (612 p.s.i.) for 300% modulus.

T. R. Dawson, in Journal of Rubber Research, January 1949, vol. 18, No. 1, stated, "The usual reinforcing agents give the best results when dry-mixed, or mechanically ground into the rubber. They give poor or no reinforcing results when latex-mixed without mechanical grinding. Lignin is the exact opposite of this—best results coprecipitated with rubber, poor to bad results when dry-mixed."

Sagajllo, writing in Rubber Chemistry and Technology, 30, pages 639–651, pointed out in 1957 that "When dry lignin, mechanically ground as finely as possible by normal methods, is incorporated into rubber by mill mixing the rubber is not reinforced, whereas when lignin and rubber are precipitated together from latex the resulting coprecipitate shows a degree of reinforcement comparable with that produced by carbon black."

Efforts to overcome the poor reinforcing qualities of lignin in dry-milled rubber have involved alterations of the lignin, changes in processing conditions, and selection of alternate rubbers. Successful efforts have included mixing, on the mill, of natural rubber with an emulsion of lignin in 5 percent aqueous ammonia solutions, as described in 1949 by T. R. Dawson in Transactions of the Institute of Rubber Industries, vol. 24, pages 227–240. Another successful discovery was described in U.S. 2,911,383 as comprising the milling together of a substantially dry alkali lignin, modified to a condition of high acetone solubility by alkali cooking, with butadiene-acrylonitrile rubbers. Data were also given therein (col. 2, lines 30–44) which showed that butadiene-acrylonitrile rubber dry-milled with comparable unmodified lignin produced elastomers having much lower strength properties.

Carboxylic elastomers were commercially introduced in 1949 in the United States in the form of a butadiene-acrylonitrile copolymer, containing an acrylic-type monomer such as acrylic acid or methacrylic acid, which was designated Hycar 1571. Methods for manufacturing this copolymer and many others are disclosed in a group of seven patents: 2,698,318; 2,724,707; 2,662,874; 2,710,292; 2,649,439; 2,671,074; and 2,626,248. Additional manufacturing information is given in U.S. 2,981,721 and 2,937,164. At the present time, carboxylic latex polymers are available from many suppliers in many forms: butadiene-styrene, acrylonitrile-butadiene, acrylates, vinyl acetates, vinyl-chlorides, and the like. In each of these polymers, the cross-linking functionality of the carboxyl groups creates properties which make it possible to consider carboxylic elastomers as a general class.

In general, the higher the carboxyl level in the polymer, the tougher and stiffer the cured product becomes; temperature range of elasticity, "nerve" of the polymer on the mill, stiffness, crumb strength, resistance to swelling by hydrocarbons and susceptibility to swelling by water are all increased by higher carboxyl level. Emulsion-type interpolymerization is typically employed to make the carboxylic elastomers, using short-stopping agents, such as hydroquinone, and stabilizing agents, such as 2-naphthylamine, before coagulation with reagents, such as hydrochloric acid, which are capable of preserving the carboxyl groups. Emulsion polymerizations of a hydrocarbon such as butadiene possess characteristics which are regulated by distribution of the unsaturated carboxylic acid monomer between the oil and water phases; the concentration of the monomer in the oil phase depends in general upon the solubility of the acid, the monomer concentration, and the effect of other materials in the system. Methacrylic acid, for example, is more oil soluble than acrylic acid.

Carboxylic elastomers can be vulcanized with sulfur by using conventional receipts, but they produce superior products with non-sulfur vulcanizations or by cross-linking by means of reactions of the carboxyl groups, such as salt formation, esterification with polyhydric alcohols or diepoxides, amide formation with polyamines, and anhydride formation. Polyvalent metal salts, through salt formation, produce stocks having optimum stress-strain properties. Zinc oxide is used widely as a vulcanizing agent. Brown and Gibbs, in the article listed hereinbefore, concluded that metal-oxide vulcanizates of carboxylic elastomers possess excellent stress-strain properties but poor compression sets; they also concluded that blacks functioned principally as loading rather than reinforcing pigments for carboxylic elastomers.

Never heretobefore has it been possible to drymill ordinary dry sulfate lignin, that has not been specially altered as to solubility or particle size, into any kind of rubber whatsoever without suffering drastic losses in rubber quality. The economic incentives for discovering a successful process appear very great, of course, and have spurred many efforts at drymilling various lignins into a wide variety of rubbers.

The object of the instant invention is to produce by dry milling an elastomeric product containing lignin as the principal pigment and having excellent strength and wear properties.

A further object is to provide a process for compounding substantially dry elastomeric materials such as carboxylic polymers with substantially dry lignin to produce rubbery products having satisfactory use qualities.

It has finally been discovered that the carboxylic polymers may be successfully drymilled with ordinary sulfate lignin. It is believed that the carboxylic groups of the rubber polymer react with the hydroxyl groups of the lignin and probably with the lignin carboxyl groups as well. It is also believed that rubbers having ester, amide, acid halide, and other carboxyl-derived groups, can successfully react with lignin. The following reactions between rubber and lignin may occur:

(1) Esterification:
Lig OH + RCOOH → RCOO Lig + $H_2O$ (2) Ester interchange:
Lig OH + RCOOEs → RCOO Lig + EsOH
LigOOCEs + RCOOH → RCOO Lig + HOOC Es (3) Acid halide:
Lig OH + RCOX → RCOO Lig + HX (4) Anhydride:

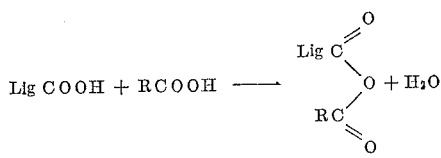

Lignin may be chemically modified for the purpose of this invention an any manner which may increase or decrease its reactivity toward the carboxyl groups of the carboxylic elastomer whereby a substantially dry lignin product can be produced which can be blended and reacted with the elastomer on the mill or in the Banbury.

In contrast to prior art efforts, these modifications are directed to controlling reactivity with carboxyl groups rather than with unsaturated positions retained by the elastomers. One particularly useful modification can be produced by reacting lignin with formaldehyde in the presence of an alkaline catalyst. Sulfate lignin, such as Indulin A or Indulin AT, can be reacted with formaldehyde in an aqueous alkaline solution at 80° C. for 2.5 hours, with initial reactant conditions at 15% lignin concentration, 3.2 moles of formaldehyde, and 2.7 moles of sodium hydroxide per 1000 parts by weight of dry lignin. The product of this reaction has additional OH groups.

In the following examples which illustrate the instant discovery, the molding procedures and tests made upon the products were in accordance with the American Society for Testing Materials, Standards on Rubber Products, March 1960. The rubbers chosen for this study were medium-high acrylonitrile copolymers sold as Hycar 1042 and Hycar 1072. The Hycar 1072 is similar to Hycar 1042 except for including carboxylic groups. Hycar 1072 has a specific gravity of 1.00, as compared to 0.98 for Hycar 1042, and a Mooney viscosity of 42–62, as compared to 70–95 for Hycar 1042.

The same carefully controlled milling procedures were used for each example to insure that each compound was prepared in the same manner, using precise timing for each operation. The procedures began with breaking down the polymer (Hycar 1042 or Hycar 1072) on a two-roll mill for 2 minutes with a roll separation of 0.008 inch. The temperature was held at 120±10° F. during the entire milling operation. Zinc oxide was added and mixed for two minutes with a roll separation of 0.055 inch. While mixing for four minutes with the same roll separation, two cuts were made ¾ of the distance across the rolls in each direction, sulfur being added during this step for some compounds. Stearic acid was added and mixed for two minutes at roll separation of 0.055 inch. Lignin was added next and milled for 10 minutes. After half the lignin was added, the roll separation was changed from 0.055 to 0.060 inch. A cut ¾ of the distance across the rolls was made in each direction after each half of the lignin was added. A mixture of tetramethyl thiuram disulfide, sold as "Methyl Tuads" and herein thus designated, and n-cyclohexyl-2-benzothiazole sulfenamide, sold as "Santocure" and hereinafter thus designated, were added and milled four minutes at roll separation of 0.060 inch. Three cuts, ¾ of the distance across the rolls, were made each way during an additional two minutes. The stock was cut from the mill, rolled and passed through the mill endwise six times at a roll separation of 0.030 inch. This operation required two minutes. Three minutes were used to sheet the stock out for curing. The compounds were cured for 30, 60, and 45 minutes in a hot press at 293° F. according to standard ASTM procedures.

Sulfate lignin in its dry, water-insoluble form, as sold under the trade name of Indulin A, and formaldehyde-modified lignin, manufactured as described hereinbefore, were dry-milled with both Hycar 1042 and Hycar 1072 to make the compounds of Example 1. The compounds thus produced were cured and tested according to exactly the same procedures as described hereinbefore. The lignin loadings were 29, 36 and 43 parts by weight which are respectively equivalent in volume to 40, 50, and 60 parts by weight of carbon black. Only the properties produced by 60-minute cures of the compounding formulation and having a lignin content at 36% by weight of the rubber loading are shown in Table 1.

The compounds not listed in tables showed that up to 1.5% sulfur addition decreased elongation of the lignin-carboxyl rubbers by about one-half and of the non-carboxylated rubbers containing lignin by about two thirds. The optimum lignin loading was found to be 36 parts by weight. Tensile strength and 300% modulus were slightly increased by longer curing, but elongation was slightly decreased when curing was lengthened from 30 minutes to 60 minutes.

Example 1 shows that the 300% moduli of the carboxylic-containing elastomers were increased considerably for rubber containing Indulin A as compared to the non-carboxylated elastomers. Ultimate tensile strength was nearly tripled yet elongation was only moderately affected. Permanent set after ultimate elongation was also considerably improved. It is only with reference to hardness and resilience characteristics that carboxylic rubbers produced less desirable elastomers for most purposes.

Using exactly the same compounding proportions and materials as in Example 1, formaldehyde-reacted sulfate lignin was dry-milled with dry butadiene-acrylonitrile rubbers, with and without a carboxylic-containing polymer. The results for Example 2 are given in Table 1 wherein 36 parts by weight of formaldehyde-reacted sulfate lignin per 100 parts of dry rubber were used. These physical properties clearly show that a formaldehyde-reacted lignin can be effectively dry-milled into a carboxylated acrylonitrile-butadiene copolymer to give compounds with high tensile strengths, high hardness, and extremely high abrasion resistance. It is equally clearly shown that the same lignin could not be dry-milled with the non-carboxylated acrylonitrile-butadiene copolymer to give good rubbers.

TABLE 1

| Example | 1 | | 2 | |
|---|---|---|---|---|
| Formulation, parts by weight: | | | | |
| Hycar 1042 | 100 | | 100 | |
| Hycar 1072 | | 100 | | 100 |
| Zinc Oxide | 5.0 | 5.0 | 5.0 | 5.0 |
| Stearic Acid | 1.0 | 1.0 | 1.0 | 1.0 |
| Indulin A | 36 | 36 | | |
| Formaldehyde-reacted Indulin A | | | 36 | 36 |
| Methyl Tuads | 2.0 | 2.0 | 2.0 | 2.0 |
| Santocure | 0.75 | 0.75 | 0.75 | 0.75 |
| Mooney Viscosity, ML-4 at 212° F | 81 | 86 | 99 | 115 |
| Properties after 60 minutes curing at 293° F.: | | | | |
| Modulus, 300%, p.s.i | 150 | 1,000 | 420 | 2,240 |
| Tensile Strength, p.s.i | 840 | 2,490 | 1,080 | 2,840 |
| Elongation, percent | 1,000+ | 550 | 900 | 400 |
| Shore A Hardness | 62 | 79 | 66 | 83 |
| Permanent Set | 55 | 10 | 40 | 26 |
| Bashore Resilience | 28 | 16 | 29 | 18 |

Further evidence as to the effectiveness of dry-milling lignin and carboxylic rubbers together can be found by analysis for gel content. Studies of polymeric materials have involved measurements of high-molecular weight fractions, commonly termed gel, for many years, and the synthetic rubber industry has been analyzing for gel content, as a measure of interpolymerization, for more than 20 years. Methods have been outlined by A. J. Medalia and I. M. Kolthoff in Journal of Polymer Science, vol. VI, No. 4, pages 433–455, by L. M. White et al. in Industrial and Engineering Chemistry, vol. 37, No. 8, pages 770–775, and by C. A. Carlton in Rubber World, February 1960, pages 678–683.

The compounds of the instant discovery, however, were tested by a simpler procedure than reparted in the literature. A sample of about one gram was reduced to a small particle size (as by grinding in a mortar or by slicing with a razorblade), wrapped in filter paper (which was placed within a 25 mm. x 65 mm. Soxhlet filter cup), and extracted with hot benzene for 14 hours. The filter cup was then dried overnight at 105° C., kept at room temperature for 2 hours, and weighed to determine "benzene insoluble" material. The percentage of "rubber gelled" was obtained by correcting for benzene-insoluble materials: lignin, zinc oxide, and sulfur. The benzene-soluble content of sulfate lignin after this Soxhlet treatment is less than 0.5% and may be neglected.

The two compounds of Example 2 (described in Table 1) were analyzed for gel content, with the results shown in Table 2. The comparative amount of curing which occurred in the filtered and dried crumbs from the uncarboxylated and carboxylated latexes furnish ample demonstration of the cross-linking capabilities imparted by carboxyl groups. The difference between the two types of rubber is even more striking when lignin additions substantially equated the two cured rubbers as to gel content.

These results with this carboxylated elastomer, as compared to a similar one lacking in carboxyl groups, seem to refute the concept that gel content in the early formulation stage inhibits proper development or mixing of ingredients to yield a homogenous system which can form a satisfactory vulcanizate. However, it is believed that this conclusion points to a different mechanism for linkage of rubber units. It is likely that the carboxylic elastomers, as compared to similar elastomers lacking in carboxylic groups, undergo a more direct chemical union with the hydroxyl or methylol units in lignin rather than forming physico-chemical bonds as a result of attrition and thermal induction. Reaction through the carboxyl groups, moreover, would be significant for any type of rubber having carboxyl groups and capable of being pigmented in a Banbury or on a mill.

TABLE 2

| Latex Used | Hycar 1042 | | | Hycar 1072 | | |
|---|---|---|---|---|---|---|
| Compound | Crumb | Coprecipitate containing 36 phr. of HCHO-reacted lignin | | Crumb | Coprecipitate containing 36 phr. of HCHO-reacted lignin | |
| Treatment | (None) | Drymilled | Cured | (None) | Drymilled | Cured |
| Tests: | | | | | | |
| Benzene insoluble, percent | 0 | 20 | 87 | 59 | 92 | 92 |
| Rubber gelled, percent | 0 | 0 | 91 | 59 | 97 | 97 |

To illustrate the significance of added carboxyl groups, a similar compounding study was made with a coprecipitated rubber formed from an SBR latex and a formaldehyde-reacted sulfate lignin which was broken down in a Banbury and blended on a roll mill, using 100 parts of rubber stock as basis, with 5.0 parts of zinc oxide, 1.0 part of stearic acid, 10.0 parts of BRS-700 (a coal tar pitch), 1.5 parts of Altax (benzothiazyl disulfide), 0.7 part of Butazate (zinc dibutyl dithiocarbonate) and 2.0 parts of sulfur. The coprecipitate contained 50.7 parts of formaldehyde-reacted lignin per 100 parts by weight of the SBR polymers, which were Pliolite 176 and Pliolite 440, non-carboxylated and carboxylated latexes, respectively, and possessing substantially identical characteristics except for added carboxyl content. The latexes were coprecipitated at 80° F. or at 200° F. and were dried at 230° F. for 2.0 hours or 2.5 hours, as listed in Table 3 for Examples 3 and 4.

taneous coprecipitation, followed by Banburying and curing, or by dry-milling of the solid material while in a substantially dry condition.

TABLE 3

| Example No. | 3 | | | 4 | | |
|---|---|---|---|---|---|---|
| Pliolite (SBR-polymer) | 176 (hydrocarbon) | | | 440 (carboxylated) | | |
| | Crumb | Coprecipitated | Cured | Crumb | Coprecipitated | Cured |
| Formaldehyde-reacted lignin loading, p./hpr | 0 | 50.7 | 50.7 | 0 | 50 | 50 |
| Coprecipitated, °F | | 80 | 200 | | 80 | 200 |
| Coagulated, °F | | 200 | 200 | | 200 | 200 |
| Dried, 230° F., hr | | 2.0 | 2.5 | | 2.0 | 2.5 |
| Benzene insol., percent | 54.5 | 79.4 | 82.9 | 89 | 84.5 | 83.3 |
| Rubber gelled, percent | 54.5 | 69.1 | 74.3 | 89 | 76.7 | 75.0 |
| Optimum cure time, min | | 90 | 90 | | 90 | 90 |
| Modulus | | 230 | 550 | | 2,490 | 2,370 |
| Tensile | | 230 | 550 | | 170 | 220 |
| Elongation | | 550 | 580 | | 88 | 89 |
| Abrasion | | 74 | 75 | | | |

Because the benzene-soluble and gelled-rubber fractions are comparable for the cured lignin rubbers of Examples 3 and 4, it is probable that different reaction mechanisms are involved. The carboxylated rubber crumb was evidently cross-linked to a greater degree (34.5%) than the hydrocarbon or non-carboxylated material, and a portion of this increased cross-linking evidently persisted after coprecipitating with half as much lignin, on a weight basis.

Although excellent tensile strength and other desirable properties can be obtained by coprecipitating lignin and latex, in general Table 3 shows that this coprecipitated latex-lignin combination (Pliolite 176 and formaldehyde-reacted lignin) could not produce strong rubbers as compared to the results achievable by using a latex having added carboxyl groups.

Reaction mechanisms dependent upon the carboxyl groups evidently impart unique properties to the lignin-containing elastomeric polymers prepared by coprecipitating and curing.

Based on the afore-mentioned studies, it is clear that alkali lignin, which is herein defined as any lignin prepared by acid precipitation from the waste liquor of an alkaline digestion of lignocellulose, may be combined with a carboxylic polymer by mutual and substantially simultaneous coprecipitation, followed by Banburying and curing, or by dry-milling of the solid material while in a substantially dry condition.

I claim:
1. The method which comprises drymilling a substantially dry alkali lignin with a carboxylic elastomer into a vulcanizable product having a tensile strength of at least 1,500 p.s.i. and a 300% modulus of at least 1,000 p.s.i. after curing at about 300° F. for 30 to 90 minutes.
2. The method of claim 1 wherein the lignin is chemically modified by reaction with formaldehyde, whereby additional hydroxyl groups are introduced.

References Cited

UNITED STATES PATENTS 2,911,383  11/1959  Doughty _____ 260—17.5
3,042,633   7/1962  White _____ 260—17.5
3,163,614  12/1964  Dimitri _____ 260—17.5

FOREIGN PATENTS 802,611  4/1956  Great Britain.
824,286  11/1959  Great Britain.

WILLIAM H. SHORT, *Primary Examiner.*

J. NORRIS, E. M. WOODBERRY, *Assistant Examiners.*